US008862738B2

(12) United States Patent
Madduri et al.

(10) Patent No.: US 8,862,738 B2
(45) Date of Patent: Oct. 14, 2014

(54) REALLOCATING RESOURCE CAPACITY AMONG RESOURCE POOLS IN A CLOUD COMPUTING ENVIRONMENT

(75) Inventors: Hari H. Madduri, Austin, TX (US); Randy A. Rendahl, Raleigh, NC (US); Brian J. Snitzer, Lancaster, PA (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 12/906,392

(22) Filed: Oct. 18, 2010

(65) Prior Publication Data
US 2012/0096165 A1 Apr. 19, 2012

(51) Int. Cl.
G06F 9/50 (2006.01)

(52) U.S. Cl.
CPC ................... *G06F 9/5011* (2013.01)
USPC ........................................ 709/226

(58) Field of Classification Search
USPC ................... 709/202, 226; 718/1; 370/235
See application file for complete search history.

(56) References Cited

U.S. PATENT DOCUMENTS

| | | | |
|---|---|---|---|
| 7,099,936 B2 | 8/2006 | Chase et al. | |
| 7,269,652 B2* | 9/2007 | Chen et al. ............... | 709/226 |
| 7,464,160 B2 | 12/2008 | Iszlai et al. | |
| 7,688,730 B2 | 3/2010 | Beadle | |
| 2002/0059274 A1 | 5/2002 | Hartsell et al. | |
| 2006/0140115 A1* | 6/2006 | Timus et al. ............. | 370/230 |
| 2006/0159014 A1 | 7/2006 | Breiter et al. | |
| 2006/0168224 A1 | 7/2006 | Midgley | |
| 2008/0109343 A1 | 5/2008 | Robinson et al. | |
| 2009/0049177 A1 | 2/2009 | Iszlai et al. | |
| 2009/0300608 A1* | 12/2009 | Ferris et al. ............. | 718/1 |
| 2012/0317168 A1* | 12/2012 | Driesen et al. ........... | 709/202 |

OTHER PUBLICATIONS

Sotomayor, B. et al., "Capacity Leasing in Cloud Systems using the OpenNebula Engine", Workshop on Cloud Computing and its Applications 2008 (CCA08), Oct. 22-23, 2008, Chicago, Illinois, USA. http://haizea.cs.uchicago.edu/pubs/Haizea_CCA08.pdf.
Maitland, J., "Keeping Control Isn't Easy", Chapter 4: Cloud-Based Infrastructure, SearchCloudComputing.com, 13 pages.
Mell et al., "The NIST Definition of Cloud Computing", National Institute of Standards and Technology, Information Technology Laboratory, Version 15, Oct. 7, 2009, 2 pages.

* cited by examiner

*Primary Examiner* — Yemane Mesfin
*Assistant Examiner* — Derrick V Rose
(74) *Attorney, Agent, or Firm* — William E. Schiesser; Keohane & D'Alessandro, PLLC

(57) ABSTRACT

In general, the embodiments of the present invention provide an approach for rebalancing/reallocating cloud resource capacities between resource pools that provide variable customer assurances and delivery penalties when assurances are not met. The variables that are considered hereunder include, overall 'reservations', total current capacity, remaining capacity against unused reservations and penalties that apply for failing to satisfy 'reservation' commitments. The approach uses a rate of capacity consumption to calculate the risk of consuming the available capacity in each resource pool (e.g., resource pools allocated to satisfy different levels of service with different SLA failure penalties). Based on the relative available capacity in each pool (as determined by the pool rate of consumption), resources are reallocated to maximize revenue (e.g., reduce financial penalty) across a resource pool set.

22 Claims, 6 Drawing Sheets

REALLOCATING RESOURCE CAPACITY AMONG RESOURCE POOLS IN A CLOUD COMPUTING ENVIRONMENT

TECHNICAL FIELD

The present invention generally relates to resource capacity allocation. Specifically, the present invention relates to the reallocation of resource capacity among resource pools in a cloud computing environment.

BACKGROUND

The cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, storage devices, etc.

Consumers of cloud computing resources have differing needs and expectations regarding the availability of computer resources. In some cases, the consumer's expectation is a best effort attempt that provides an inexpensive option to enhance total capacity to cover peaks or other situations. In some cases a lack of extra capacity will not be highly disruptive, it may be less optimal. In other cases, though the consumer is using cloud resources for handling peak demand or critical requirements, there is a fundamental expectation and need to be able to rely on that capacity when it is needed (as if a flexible use 'reservation' is in place). In the latter case, the consumer usually opts to pay additional fees to assure capacity on-demand to avoid disruptive consequences (or, in other cases, to take advantage of related pricing discounts due to the up-front financial commitment). Providing capacity assurance to a consumer creates a capacity planning challenge for the cloud computing provider. The upfront fee is generally not designed to cover the cost of reserving hardware for the consumer since that would not be economical for the consumer. Therefore, the cloud provider needs to allow that capacity to be used elsewhere, while maintaining a reasonable ability to satisfy the outstanding 'reservations'.

SUMMARY

In general, the embodiments of the present invention provide an approach for rebalancing/reallocating cloud resource capacities between resource pools that provide variable customer assurances and delivery penalties when assurances are not met. The variables that are considered hereunder include, overall 'reservations', total current capacity, remaining capacity against unused reservations and penalties that apply for failing to satisfy 'reservation' commitments. The approach uses a rate of capacity consumption to calculate the risk of consuming the available capacity in each resource pool (e.g., resource pools allocated to satisfy different levels of service with different Service Level Agreement (SLA) failure penalties). Based on the relative available capacity in each pool (as determined by the pool rate of consumption), resources are reallocated to maximize revenue (e.g., reduce financial penalty) across a resource pool set.

A first aspect of the present invention provides a method for reallocating resource capacity among resource pools in a cloud computing environment, comprising: receiving a request; classifying the request based on details of the request and an applicable set of Service Level Agreement (SLA) terms; determining a rate of consumption and a saturation point of a set of resource pools based on fulfillment of the request; determining a potential penalty for failing to fulfill future requests, the future requests being predicted based on the rate of consumption; and reallocating a resource capacity among the set of resource pools based on the rate of consumption, the saturation point, and the potential penalty so that the potential penalty is minimized.

A second aspect of the present invention provides a system for reallocating resource capacity among resource pools in a cloud computing environment, comprising: a bus; a processor coupled to the bus; and a memory medium coupled to the bus, the memory medium comprising instructions to: receive a request; classify the request based on details of the request and an applicable set of Service Level Agreement (SLA) terms; determine a rate of consumption and a saturation point of a set of resource pools based on fulfillment of the request; determine a potential penalty for failing to fulfill future requests, the future requests being predicted based on the rate of consumption; and reallocate a resource capacity among the set of resource pools based on the rate of consumption, the saturation point, and the potential penalty so that the potential penalty is minimized.

A third aspect of the present invention provides a computer program product for reallocating resource capacity among resource pools in a cloud computing environment, the computer program product comprising a computer readable storage media, and program instructions stored on the computer readable storage media, to: receive a request; classify the request based on details of the request and an applicable set of Service Level Agreement (SLA) terms; determine a rate of consumption and a saturation point of a set of resource pools based on fulfillment of the request; determine a potential penalty for failing to fulfill future requests, the future requests being predicted based on the rate of consumption; and reallocate a resource capacity among the set of resource pools based on the rate of consumption, the saturation point, and the potential penalty so that the potential penalty is minimized.

A fourth aspect of the present invention provides a method for deploying a system for reallocating resource capacity among resource pools in a cloud computing environment, comprising: deploying a computer infrastructure being operable to: receive a request; classify the request based on details of the request and an applicable set of Service Level Agreement (SLA) terms; determine a rate of consumption and a saturation point of a set of resource pools based on fulfillment of the request; determine a potential penalty for failing to fulfill future requests, the future requests being predicted based on the rate of consumption; and reallocate a resource capacity among the set of resource pools based on the rate of consumption, the saturation point, and the potential penalty so that the potential penalty is minimized.

BRIEF DESCRIPTION OF THE DRAWINGS

These and other features of this invention will be more readily understood from the following detailed description of the various aspects of the invention taken in conjunction with the accompanying drawings in which.

Figure 1:
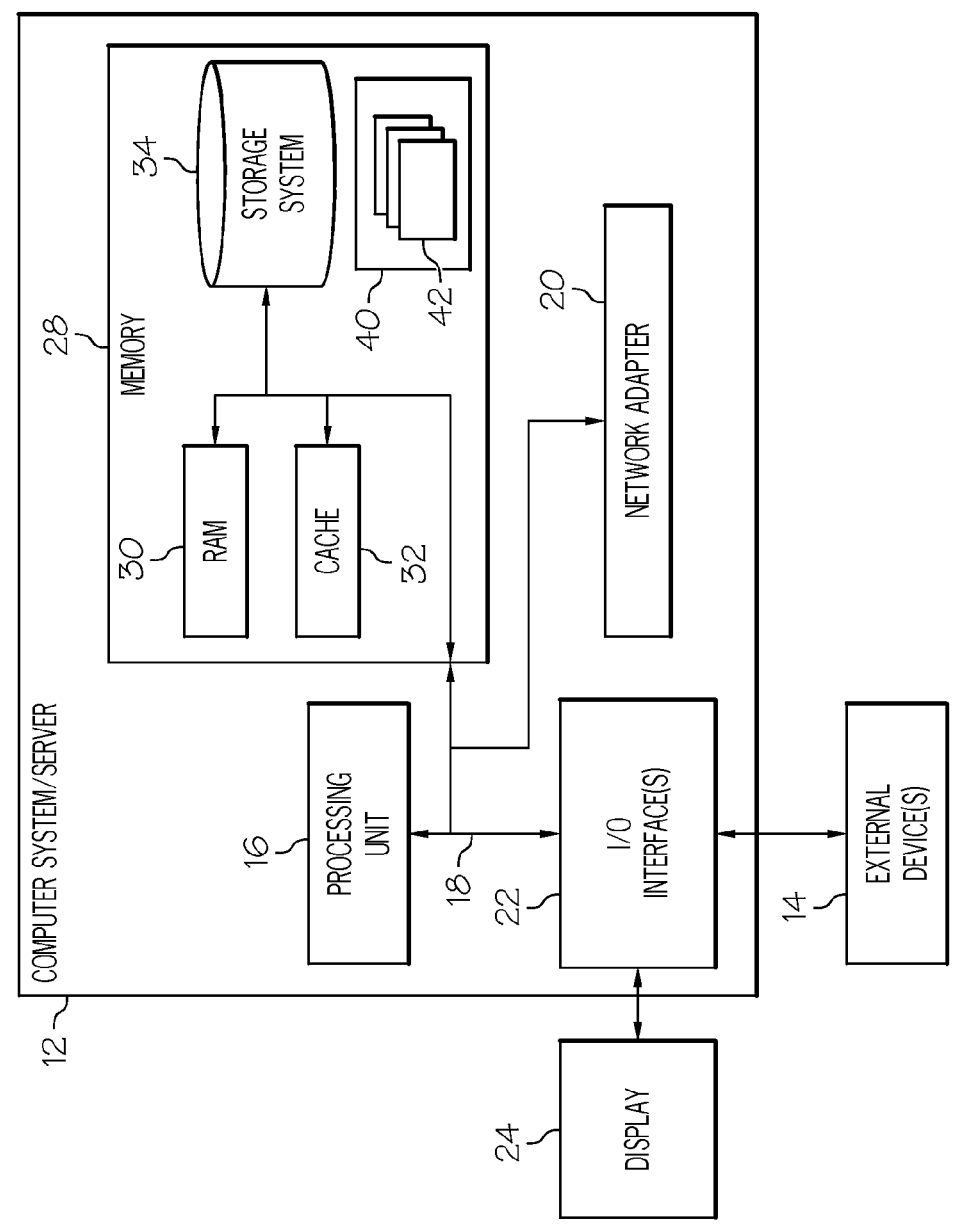
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, the embodiments of the present invention provide an approach for rebalancing/reallocating cloud resource capacities between resource pools that provide variable customer assurances and delivery penalties when assurances are not met. Additionally, the rate of consumption allows the embodiments to forecast the likelihood of exhausting a given pool in a specific period of time. The consumption rate calculation enables not just determining that resources are not only being exhausted in a given pool, but when the resources will be depleted. This allows the forecasting of when a pool should grow in capacity. In any event, variables that are considered hereunder include, overall 'reservations', total current capacity, remaining capacity against unused reservations, and penalties that apply for failing to satisfy 'reservation' commitments. The approach uses a rate of capacity consumption to calculate the risk of consuming the available capacity in each resource pool (e.g., resource pools allocated to satisfy different levels of service with different Service Level Agreement (SLA) failure penalties). Based on the relative available capacity in each pool (as determined by the pool rate of consumption), resources are reallocated to maximize revenue (e.g., reduce financial penalty) across a resource pool set.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
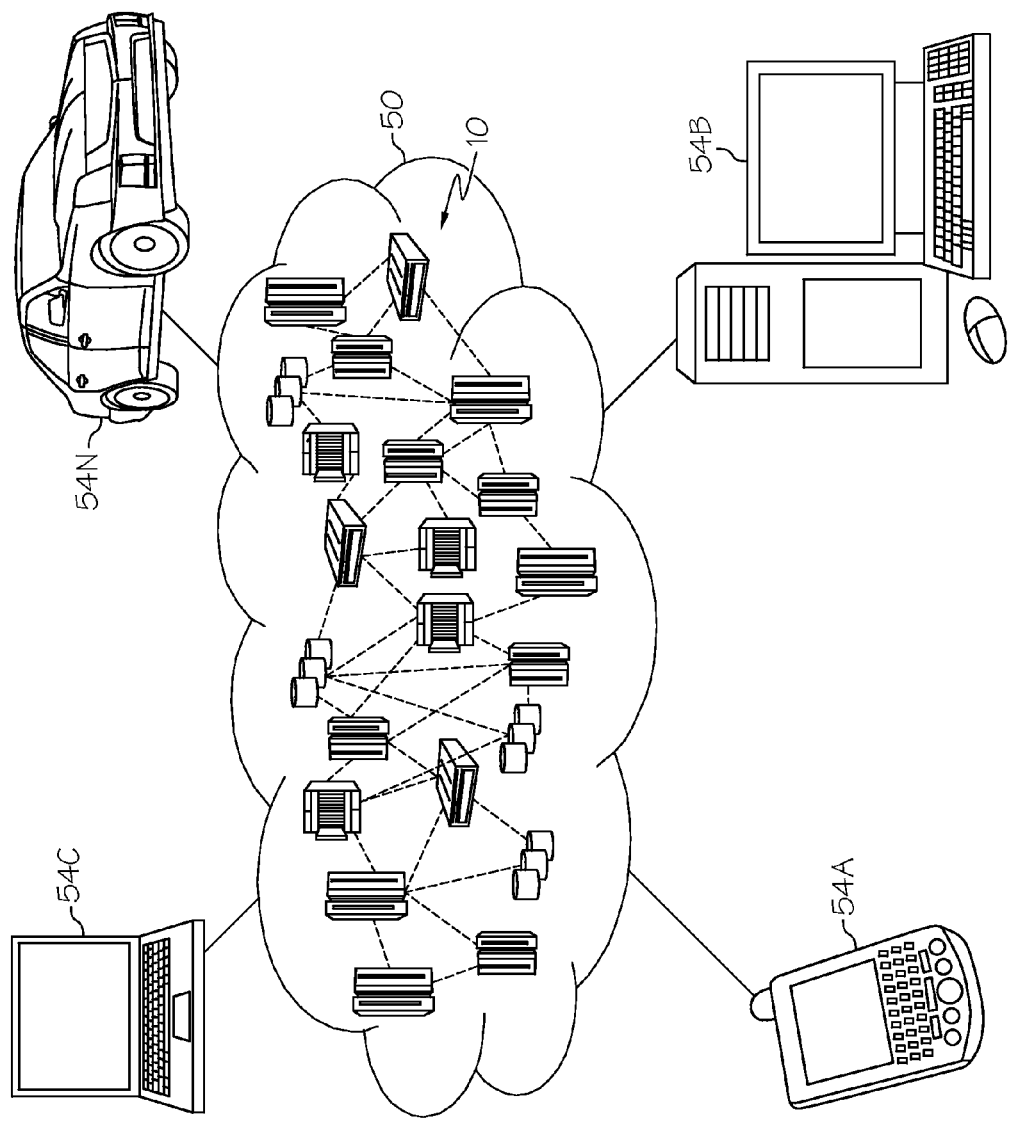
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
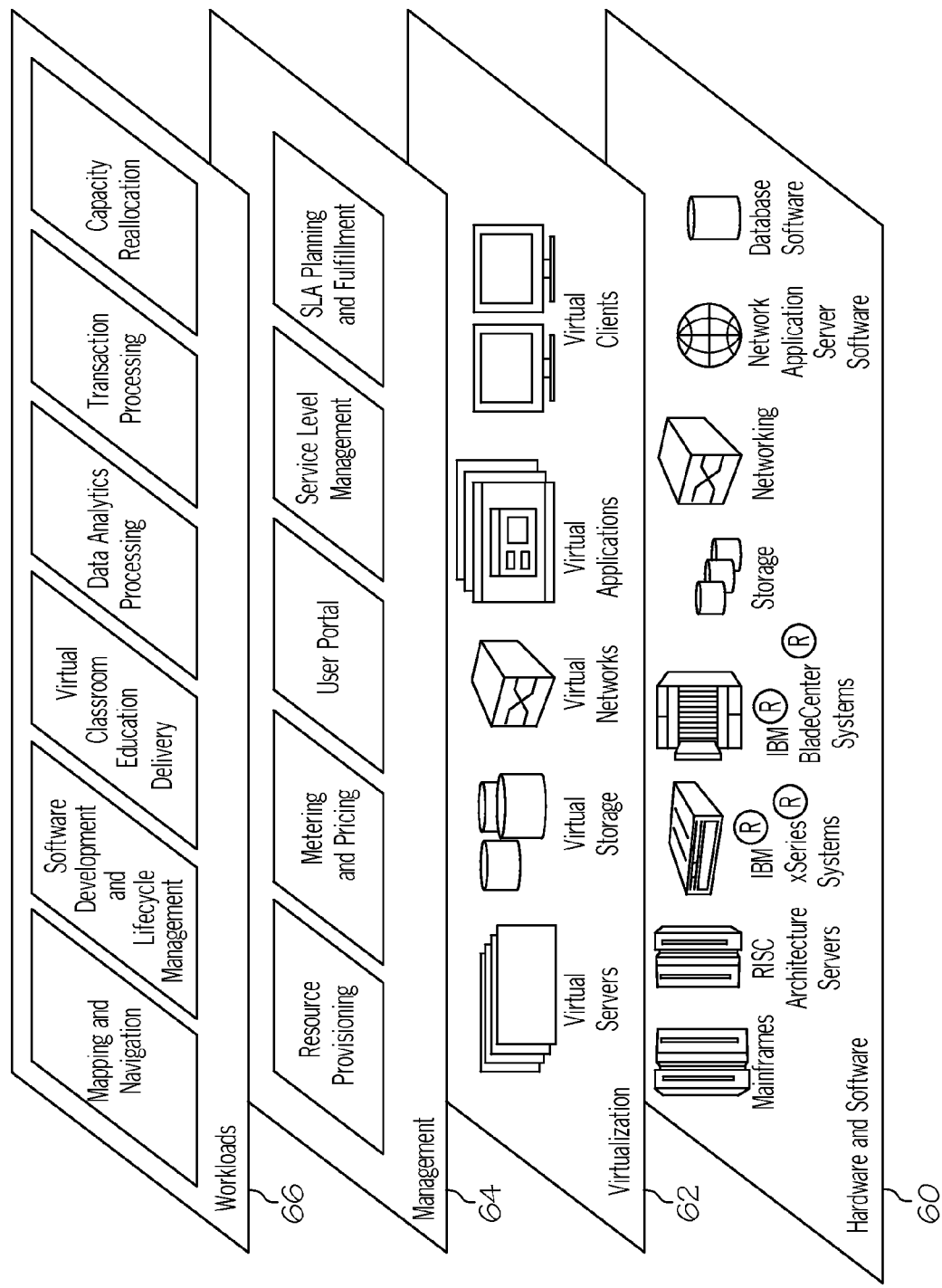
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and capacity reallocation. As mentioned above, all of the foregoing examples described with respect to FIG. 3 are illustrative only, and the invention is not limited to these examples.

It is understood all functions of the present invention as described herein are typically performed by the capacity reallocation function, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

In a traditional IT environment, the solution to providing a consumer with an assurance of available computing capacity is to set aside resources that will be used to satisfy an incoming request. Though it provides complete assurance that the capacity will be available when needed, it is neither scalable nor economically viable when a usage based pricing model is coupled with the environment as in a cloud computer context. That is, unless the consumer uses the capacity continuously, the time the capacity is not in use is a continuing cost to the cloud provider that has no revenue to cover time when the capacity is idle.

A flexible cloud environment provides a mapping of cost to revenue, but does little to keep on-demand consumers (those having no 'reservations') from saturating the computing resources and leaving a lack of resources to enable the cloud provider to satisfy 'reservations'. In this model, one of the only viable options to satisfy the 'reservations' in the case of a saturated cloud is to begin shutting down the on-demand instances. Though that may be financially advantageous if there is little or no penalty for those shutdowns, it is likely to quickly lead to instance and reputation impacts that will greatly reduce the on-demand usage of the cloud and likely increase the 'reservation' problem due to the lack of on-demand use providing revenue coverage.

The approach outlined herein provides a hybrid approach that dynamically balances resources between pools of variable assurance or financial penalty. In a typical embodiment, there are at least two resource pools. One pool has no penalty for not being able to provide resources when requested. The other pool has a financial penalty for any request that cannot be satisfied. This model can easily be expanded to leverage a set of pools that each has differing penalty impact levels ranging from no-penalty for lack of capacity to the maximum penalty for lack of capacity. In each cloud computing environment, the allocations and risk profiles will be unique to the circumstances, but the following strategy provides an approach to optimize the providers' ability to recoup costs while still providing the opportunity for consumers to request 'reservations'.

One aspect of this approach is the management of risk. Risk cannot be eliminated unless a complete environment capable of satisfying any outstanding reservations with the available unallocated capacity is provided. In order to provide cloud resources at a competitive price, the cloud provider needs to optimize by reducing this available capacity to an amount less than the outstanding reservations and thus introduce risk. The amount of capacity kept free for 'reservation' use is driven by the relationship between the revenue for capacity and the penalty for failing to satisfy a reservation. An added complexity is the fact that there will be potentially multiple 'reservations' with each having its own penalty. These may need to be managed individually such that the number of reservations impacted (or the least financially relevant) is minimized.

Prior to any reservation requests, the cloud provider would allocate all resources to the on-demand pool to satisfy reservation-less requests. As reservations are created, resources will be transferred into the reservation pool(s) as indicated by the provider risk profile.

Balancing the risk across the pools is based on several key metrics that are defined here:

Rate of Instance De-provisioning=Number of, or overall capacity of instances that free up per unit of time, primarily oriented around predicting the rate at which a cloud would become available without new instances coming online.

Rate of Instance Provisioning=Number of, or overall capacity of instances that are consumed per unit of time, primarily oriented around predicting the rate at which a cloud would become unavailable without instances being de-provisioned.

Rate of Consumption=Net number of, or overall capacity of instances that are consumed.

Reserved Capacity=Total number of, or overall capacity of instances that are reserved in a given pool.

Reservation Capacity=Total number of, or overall capacity of instances that are available to satisfy the reservations in a given pool.

On-demand Capacity=Total number of, or overall capacity of instances that are available to satisfy the on-demand requests.

Algorithm: The following approach describes an algorithm for managing the capacity to maintain a balance between the on-demand and reservation environments. Though the approach can be expanded to cascade across multiple environments, it will demonstrate the approach with only two pools of capacity for illustrative purposes.

Pool A—On-demand pool. No penalty for lack of capacity.

Pool B—Reservation pool. Penalties apply for not providing expected capacity. In this case, the penalties are greater than the revenue that is acquired by an on-demand reservation. In this model, the following algorithm may be used to manage the capacity between the two pools:

Steady state (no new reservations involved)
(1) Calculate the rate of consumption in Pool B;
(2) Determine the time until saturation;
(3) If the time is less than the risk threshold, initiate the transfer of capacity from Pool A to Pool B Calculate the transfer amount based on a target threshold that is greater than the risk threshold to provide a predetermined buffer before the analysis is likely to require capacity transfer again If Pool A does not have adequate available capacity, initiate partial transfer and discontinue on-demand provisioning until sufficient capacity has been transferred;

Alerts need to be raised if the Rate of Instance De-provisioning in Pool A is not high enough to achieve the capacity transfer needed prior to Pool B saturating;

If Pool A does not have sufficient capacity overall, additional alerts need to be raised to actually initiate an overall capacity increase (though it is not likely that getting to this point in the steady state algorithm will be a sufficiently timely option); and (4) If the time is greater than the overcapacity threshold, conditionally initiate the transfer of capacity from Pool B to Pool A;

Use the Rate of Consumption of Pool A to determine if it is on pace to saturate within a window of time worth adding capacity immediately (set based on cost of transferring capacity against a business defined time window). It should be noted that transferring capacity back to Pool A may only be practical if the On-Demand use will use the capacity since it does not cost more to be in one pool or the other. It should be noted that in the case where there are more than two pools, the logic could cascade from the most critical pool back through the decreasingly critical pools to access additional storage. Instead of just taking the least critical capacity (which would consistently leave that pool starved), it would look for the most extraneous capacity (that which has extended time until saturation), taking from the least critical of those pools.

Figure 4:
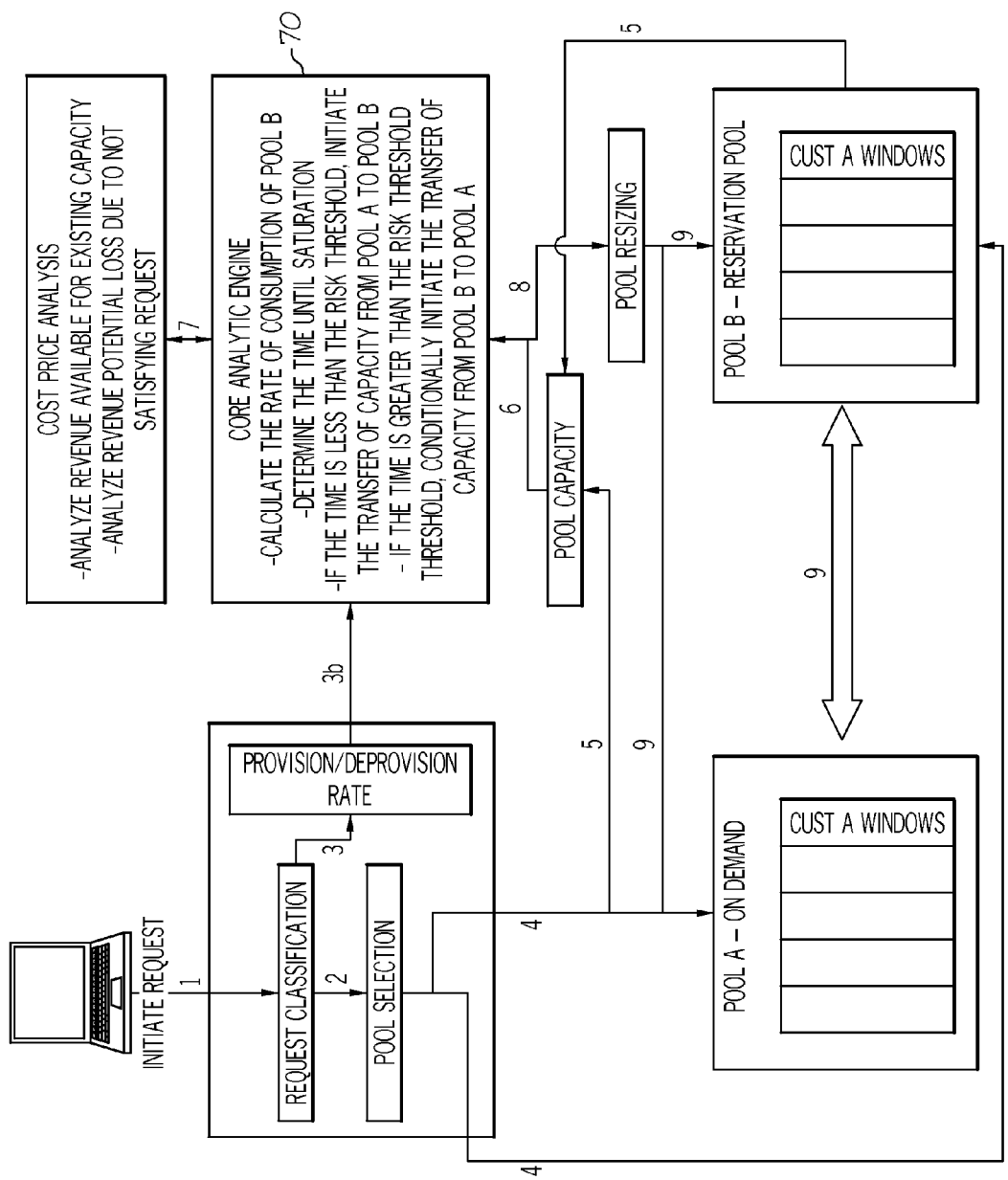
FIG. 4 depicts a first component flow diagram according to an embodiment of the present invention.
Figure 5:
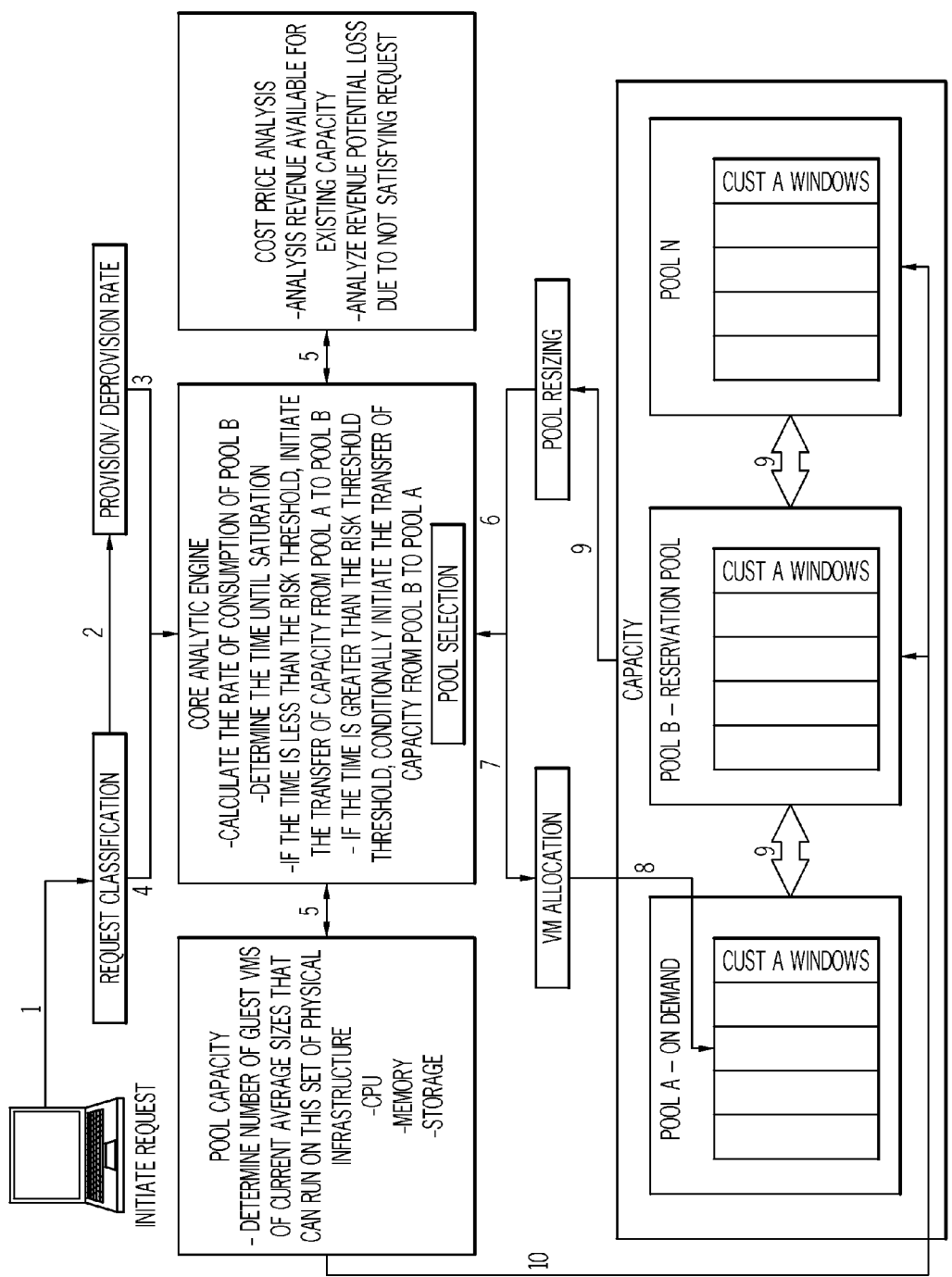
FIG. 5 depicts a second component flow diagram according to an embodiment of the present invention.

Referring now to FIG. 4, a component flow diagram according to an embodiment of the present invention is shown. As depicted, the process is as follows:

1—A user requests an instance and it is classified as against either their reserved or unreserved capacity;

2—Based on a classification, the request is directed to either a reservation pool or an unreserved pool;

3—The request is time stamped, and the rate engine determines the overall frequency of provision and de-provision requests of each category;

3b—Frequency of change in the environment is periodically sent to a core analytic engine 70 (which can comprise program/utility 40 having program modules 42 of FIG. 1);

4—The instance is provisioned in the appropriate pool;

5—On a periodic basis, the total used and available capacity within the pool is analyzed;

6—Total used and available capacity is communicated to core analytic engine 70;

7—Based on current capacity in each pool and on the rate of consumption of each pool, a cost/price analysis is performed, identifying the most revenue-optimal use of resources for the current infrastructure. User-selectable parameters could include the acceptable risk of provisioning failure, the frequency of analysis, cost of moving resources from one pool to another, and the duration of the forecast;

8—Core analytic engine 70 determines the rate of consumption and compares it to the saturation/risk threshold. It initiates calls to the pool resizing engine to move resources from one pool to another, in accordance with the most optimal configuration of settings;

9—Pool resizing executes changes to move resources from one pool to another;

Referring now to FIG. 5, another component flow diagram according to another embodiment of the present invention is shown. As depicted, the process is as follows:

1—A user requests an instance and it is classified as against either their reserved or unreserved capacity;

2—The request is time-stamped, the overall frequency of provision and de-provision requests of each category are determined;

3—A frequency of change in the environment is periodically sent to the analytics engine;

4—The request is sent to core analytic engine 70 to determine the appropriate location for resource (e.g., virtual machine) and the appropriate pool size;

5—Core analytic engine 70 consults the pool capacity component to determine the most optimal location for this request (satisfying all user requested conditions). It also interacts with the cost/price analysis engine to determine the most financially efficient way to both satisfy the request and to manage the remainder of the infrastructure. Core analytic engine 70 determines the rate of consumption and compares it to the saturation/risk threshold. It initiates calls to the pool resizing engine to move resources from one pool to another, in accordance with the most optimal configuration of settings;

6—Core analytic engine 70 sends commands to the pool resizing component to adjust the size of the pools in accordance with core analytic engine 70's output;

7—The user's resource (e.g., virtual machine) is requested against a specific (optimal) system within the optimal pool;

8—The user's resource (e.g., virtual machine) is provisioned;

9—Pool resizing executes reallocation of resources from one pool to another; and 10—The pool capacity component is updated with current capacity data As can be seen, under these embodiments, virtual resources can be segmented flexibly out of physical resources. For example, a variable quantity of virtual machines can be created out of the same physical server. This plasticity in the resources makes this analytic engine very dynamic. Moreover, core analytic engine 70 can move things around to make room for a new virtual machine, and core analytic engine 70 does so while considering the current pool size information, cost of moving, revenue potential, current pool sizes, cost of moving (at the time of request). Still yet, real-time dynamic information provided hereunder about available resources (pools), costs of resources, costs of moving virtual resources, and projected provisioning and de-provisioning patterns make the optimal answers given by core analytic engine 70 different at different times. Further, in the interest of fast provisioning, core analytic engine 70 can make the resource allocation decision in parallel with a scheduled pool resize decision.

Figure 6:
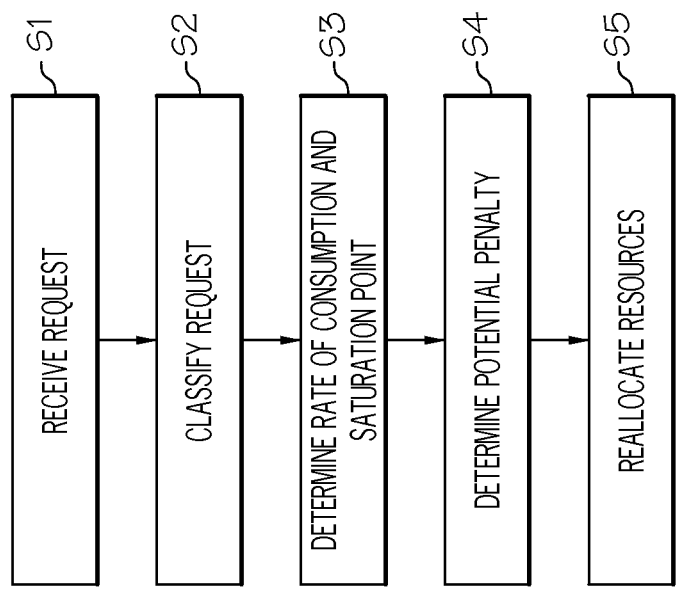
FIG. 6 depicts a method flow diagram according to an embodiment of the present invention.

Referring now to FIG. 6, a method flow diagram in accordance with these embodiments is shown. In step S1, a request is received. In step S2, the request is classified based on details of the request and an applicable set of Service Level Agreement (SLA) terms. In step S3, a rate of consumption and a saturation point of a set of resource pools (e.g., an on-demand based resource pool, and a reservation based resource pool) are determined based on fulfilling the request. The saturation point can be determined based on a provisioning rate and a de-provisioning rate of the set of resource pools. In step S4, a potential penalty (e.g., financial penalty) for failing to fulfill future requests is determined. As mentioned above, the future requests are predicted based on the rate of consumption. In step S5, a resource capacity (e.g., a Central Processing Unit (CPU) capacity, a memory capacity, a storage capacity, a virtual machine capacity, or a network location) is reallocated among the set of resource pools based on the rate of consumption, the saturation point, and the potential penalty, so that future requests can be fulfilled and/or the potential penalty can be minimized.

As indicated above, the reallocation can occur from the on-demand based resource pool to the reservation based resource pool so that the scheduled future jobs can be fulfilled and the potential penalty can be avoided. However, in another embodiment the set of resource pools can comprise at least three resource pools. In such an embodiment, the reallocation can occur from a resource pool having a lower potential penalty to a resource pool having a higher potential penalty.

While shown and described herein as a resource capacity reallocation solution, it is understood that the invention further provides various alternative embodiments. For example, in one embodiment, the invention provides a computer-readable/useable medium that includes computer program code to enable a computer infrastructure to provide resource capacity reallocation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide resource capacity reallocation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for resource capacity reallocation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for reallocating resource capacity among resource pools in a cloud computing environment, comprising:
   receiving a request for an instance of a virtual machine;
   classifying the request based on details of the request and an applicable set of Service Level Agreement (SLA) terms;
   determining a rate of consumption and a saturation point of a set of resource pools based on fulfillment of the request, the set of resource pools comprising a reservation based pool and an on-demand based pool;
   determining a potential penalty for failing to fulfill future requests for instances in the reservation based pool, the future requests being predicted based on the rate of consumption;
   calculating a risk of failure to the fulfill future requests among the set of resource pools based on a rate of instance de-provisioning, a rate of instance-provisioning, a rate of consumption, a reserved capacity, a reservation capacity, and an on-demand capacity;
   calculating an amount of resource capacity necessary for the reservation based pool based on the risk, the rate of consumption, the saturation point, and the potential penalty so that the potential penalty is minimized and a number of reservations, for the reservation based pool, impacted is minimized;
   estimating an amount of resource capacity that will potentially be consumed in the reservation based pool in addition to the calculated amount of resource capacity between a time of a reallocation of the calculated amount of resource capacity and a time of another reallocation;
   calculating an amount of a capacity required to be transferred from the on-demand based pool to the reservation based pool to fulfill the calculated amount of resource capacity and the estimated amount of resource capacity;
   initiating a partial transfer of resource capacity and discontinuing on-demand provisioning until sufficient capacity has been transferred if the on-demand based Pool does not have adequate capacity to achieve the capacity transfer;
   raising an alert if the rate of instance de-provisioning in the on-demand based pool is not high enough to achieve the capacity transfer prior to a saturation of the reservation based pool; and
   reallocating the calculated amount of resource capacity and the estimated amount of resource capacity from the on-demand based pool to the reservation based pool.

2. The method of claim 1, the resource capacity comprising at least one of the following: a Central Processing Unit (CPU) capacity, a memory capacity, a storage capacity, a virtual machine capacity, or a network location.

3. The method of claim 1, further comprising selecting the reservation based pool from the set of resource pools for fulfilling the request.

4. The method of claim 1, the potential penalty comprising a financial penalty.

5. The method of claim 1, further comprising:
   determining a provisioning rate and a de-provisioning rate of the set of resource pools; and
   using the provisioning rate and the de-provisioning rate to determine the rate of consumption and the saturation point.

6. The method of claim 1, the set of resource pools comprising an on-demand based resource pool, and a reservation based resource pool.

7. The method of claim 1, the set of resource pools comprising at least three resource pools.

8. The method of claim 7, the reallocating comprising reallocating the resource capacity a resource pool having a lower potential penalty to a resource pool having a higher potential penalty.

9. The method of claim 7, the reallocating being performed asynchronous with a processing of the request.

10. A system for reallocating resource capacity among resource pools in a cloud computing environment, comprising:
    a bus;
    a processor coupled to the bus; and
    a memory medium coupled to the bus, the memory medium comprising instructions to:
       receive a request for an instance of a virtual machine;
       classify the request based on details of the request and an applicable set of Service Level Agreement (SLA) terms;
       determine a rate of consumption and a saturation point of a set of resource pools based on fulfillment of the request, the set of resource pools comprising a reservation based pool and an on-demand based pool;
       determine a potential penalty for failing to fulfill future requests for instances in the reservation based pool, the future requests being predicted based on the rate of consumption;
       calculate a risk of failure to the fulfill future requests among the set of resource pools based on a rate of instance de-provisioning, a rate of instance-provisioning, a rate of consumption, a reserved capacity, a reservation capacity, and an on-demand capacity;
       calculate an amount of resource capacity necessary for the reservation based pool based on the risk, the rate of consumption, the saturation point, and the potential penalty so that the potential penalty is minimized and a number of reservations, for the reservation based pool, impacted is minimized;
estimate an amount of resource capacity that will potentially be consumed in the reservation based pool in addition to the calculated amount of resource capacity between a time of a reallocation of the calculated amount of resource capacity and a time of another reallocation;
calculate an amount of a capacity required to be transferred from the on-demand based pool to the reservation based pool to fulfill the calculated amount of resource capacity and the estimated amount of resource capacity;
initiating a partial transfer of resource capacity and discontinuing on-demand provisioning until sufficient capacity has been transferred if the on-demand based pool does not have adequate capacity to achieve the capacity transfer;
raising an alert if the rate of instance de-provisioning in the on-demand based pool is not high enough to achieve the capacity transfer prior to a saturation of the reservation based pool; and
reallocate the calculated amount of resource capacity and the estimated amount of resource capacity from the on-demand based pool to the reservation based pool.

11. The system of claim 10, the resource capacity comprising at least one of the following: a Central Processing Unit (CPU) capacity, a memory capacity, a storage capacity, a virtual machine capacity, or a network location.

12. The system of claim 10, the memory medium further comprising instructions to select the reservation based pool from the set of resource pools for fulfilling the request.

13. The system of claim 10, the potential penalty comprising a financial penalty.

14. The system of claim 10, the memory medium further comprising instructions to:
determine a provisioning rate and a de-provisioning rate of the set of resource pools; and
use the provisioning rate and the de-provisioning rate to determine the rate of consumption and the saturation point.

15. The system of claim 10, the set of resource pools comprising an on-demand based resource pool, and a reservation based resource pool.

16. A computer program product for reallocating resource capacity among resource pools in a cloud computing environment, the computer program product comprising a non-transitory computer readable storage media, and program instructions stored on the computer readable storage media, to:
receiving a request for an instance of a virtual machine;
classifying the request based on details of the request and an applicable set of Service Level Agreement (SLA) terms;
determining a rate of consumption and a saturation point of a set of resource pools based on fulfillment of the request, the set of resource pools comprising a reservation based pool and an on-demand based pool;
determining a potential penalty for failing to fulfill future requests for instances in the reservation based pool, the future requests being predicted based on the rate of consumption;
calculating a risk of failure to the fulfill future requests among the set of resource pools based on a rate of instance de-provisioning, a rate of instance-provisioning, a rate of consumption, a reserved capacity, a reservation capacity, and an on-demand capacity;
calculate an amount of resource capacity necessary for the reservation based pool based on the risk, the rate of consumption, the saturation point, and the potential penalty so that the potential penalty is minimized and a number of reservations, for the reservation based pool, impacted is minimized;
estimate an amount of resource capacity that will potentially be consumed in the reservation based pool in addition to the calculated amount of resource capacity between a time of a reallocation of the calculated amount of resource capacity and a time of another reallocation;
calculate an amount of a capacity required to be transferred from the on-demand based pool to the reservation based pool to fulfill the calculated amount of resource capacity and the estimated amount of resource capacity;
initiating a partial transfer of resource capacity and discontinuing on-demand provisioning until sufficient capacity has been transferred if the on-demand based pool does not have adequate capacity to achieve the capacity transfer;
raising an alert if the rate of instance de-provisioning in the on-demand based pool is not high enough to achieve the capacity transfer prior to a saturation of the reservation based pool; and
reallocate the calculated amount of resource capacity and the estimated amount of resource capacity from the on-demand based pool to the reservation based pool.

17. The computer program product of claim 16, the resource capacity comprising at least one of the following: a Central Processing Unit (CPU) capacity, a memory capacity, a storage capacity, a virtual machine capacity, or a network location.

18. The computer program product of claim 16, further comprising program instructions stored on the non-transitory computer readable storage media to select the reservation based pool from the set of resource pools for fulfilling the request.

19. The computer program product of claim 16, the potential penalty comprising a financial penalty.

20. The computer program product of claim 16, further comprising program instructions stored on the non-transitory computer readable storage media to:
determine a provisioning rate and a de-provisioning rate of the set of resource pools; and
use the provisioning rate and the de-provisioning rate to determine the rate of consumption and the saturation point.

21. The computer program product of claim 16, the reallocation occurring from the on-demand based resource pool to the reservation based resource pool so the potential penalty can be minimized.

22. A method for deploying a system for reallocating resource capacity among resource pools in a cloud computing environment, comprising:
deploying a computer infrastructure being operable to:
receiving a request for an instance of a virtual machine;
classifying the request based on details of the request and an applicable set of Service Level Agreement (SLA) terms;
determining a rate of consumption and a saturation point of a set of resource pools based on fulfillment of the request, the set of resource pools comprising a reservation based pool and an on-demand based pool;

determining a potential penalty for failing to fulfill future requests for instances in the reservation based pool, the future requests being predicted based on the rate of consumption;

calculating a risk of failure to the fulfill future requests among the set of resource pools based on a rate of instance de-provisioning, a rate of instance-provisioning, a rate of consumption, a reserved capacity, a reservation capacity, and an on-demand capacity;

calculate an amount of resource capacity necessary for the reservation based pool based on the risk, the rate of consumption, the saturation point, and the potential penalty so that the potential penalty is minimized and a number of reservations, for the reservation based pool, impacted is minimized;

estimate an amount of resource capacity that will potentially be consumed in the reservation based pool in addition to the calculated amount of resource capacity between a time of a reallocation of the calculated amount of resource capacity and a time of another reallocation;

calculate an amount of a capacity required to be transferred from the on-demand based pool to the reservation based pool to fulfill the calculated amount of resource capacity and the estimated amount of resource capacity;

initiating a partial transfer of resource capacity and discontinuing on-demand provisioning until sufficient capacity has been transferred if the on-demand based Pool does not have adequate capacity to achieve the capacity transfer;

raising an alert if the rate of instance de-provisioning in the on-demand based pool is not high enough to achieve the capacity transfer prior to a saturation of the reservation based pool; and reallocate the calculated amount of resource capacity and the estimated amount of resource capacity from the on-demand based pool to the reservation based pool.

* * * * *